United States Patent
Jones et al.

(10) Patent No.: US 8,799,889 B2
(45) Date of Patent: Aug. 5, 2014

(54) APPLICATION DOWNLOADING

(75) Inventors: Gareth E. Jones, Winchester (GB); James C. Thomas, Newbury (GB)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 13/456,380

(22) Filed: Apr. 26, 2012

(65) Prior Publication Data

US 2012/0290681 A1    Nov. 15, 2012

(30) Foreign Application Priority Data

May 9, 2011    (EP) ..................................... 11165296

(51) Int. Cl.
*G06F 9/44*    (2006.01)

(52) U.S. Cl.
USPC .......................................................... 717/172

(58) Field of Classification Search
USPC ............................ 717/168–178; 709/217, 219
See application file for complete search history.

(56) References Cited

U.S. PATENT DOCUMENTS

| | | | | |
|---|---|---|---|---|
| 5,909,581 | A * | 6/1999 | Park ................................ | 717/170 |
| 6,035,423 | A * | 3/2000 | Hodges et al. ................. | 714/38.1 |
| 6,047,128 | A * | 4/2000 | Zander ........................... | 717/173 |
| 6,470,494 | B1 | 10/2002 | Chan et al. | |
| 6,715,143 | B1 * | 3/2004 | Chantrain et al. ............. | 717/174 |
| 7,376,653 | B2 | 5/2008 | Hart, III | |
| 7,665,080 | B2 | 2/2010 | Spotwood | |
| 7,770,168 | B1 * | 8/2010 | Howarth et al. ............... | 717/178 |
| 7,783,470 | B2 * | 8/2010 | Kahlon ........................... | 703/22 |
| 2002/0165935 | A1 * | 11/2002 | Lawrence et al. ............. | 709/217 |
| 2003/0191812 | A1 * | 10/2003 | Agarwalla et al. ............ | 709/217 |
| 2006/0236300 | A1 * | 10/2006 | Lajolo et al. ................... | 717/100 |
| 2006/0259589 | A1 * | 11/2006 | Lerman et al. ................. | 709/219 |
| 2009/0024982 | A1 | 1/2009 | Diep et al. | |
| 2009/0292791 | A1 | 11/2009 | Livshits et al. | |
| 2010/0235464 | A1 * | 9/2010 | Iyer et al. ....................... | 709/217 |
| 2012/0166583 | A1 * | 6/2012 | Koonce et al. ................. | 709/217 |
| 2012/0216184 | A1 * | 8/2012 | Jones et al. .................... | 717/172 |
| 2012/0290681 | A1 * | 11/2012 | Jones et al. .................... | 709/217 |

OTHER PUBLICATIONS

Heuser, Jakob, "Improve Your Page Performance with Lazy Loading," http://www.digital-web.com/articles/improve_page_performance_with_lazy_loading, May 6, 2008.

"On-Demand Javascript," http://ajaxpatterns.org/On-Demand_Javascript.

* cited by examiner

*Primary Examiner* — Lance L Barry
(74) *Attorney, Agent, or Firm* — Winstead, P.C.

(57) ABSTRACT

A method, system and computer program product for downloading an application over a network from a remote server to a client device, where the application includes a plurality of modules. A class for each module is created, where the class includes a constructor. A request to use a module of the application is received. Upon receiving the request, a determination is made as to whether the received request is a first request to use the module. If the received request is the first request to use the module, then the requested module is downloaded, the constructor is overwritten with the downloaded module and the constructor within the created class for the requested module is executed.

12 Claims, 5 Drawing Sheets

APPLICATION DOWNLOADING

CROSS-REFERENCE TO RELATED APPLICATIONS

This application claims priority under 35 U.S.C. §119(a) from European Patent Application No. 11165296.2, filed on May 9, 2011, the contents of which are incorporated herein by reference.

TECHNICAL FIELD

The present invention relates generally to application management, and more particularly, to downloading an application over a network from a remote server to a client device.

BACKGROUND

Over the past decade, the advent of Asynchronous JavaScript® (AJAX) technologies and the enormous increase in browser performance has enabled Internet browsers to run fully featured user applications. The majority of these applications make extensive use of the JavaScript® programming language (Java and all Java-based trademarks and logos are trademarks or registered trademarks of Oracle and/or its affiliates). As JavaScript® based web applications continue to grow in functionality, developers began to apply practices from traditional software development to cope with the increase in complexity. One of the most common examples is splitting out application classes into separate JavaScript® files. These files are then stored in common directories, indicating their relationship with each other. This practice gives the application the concept of separate "modules," enabling easier reuse of modules across applications and allowing different parts of the application to load only those parts that are required.

To control the management and loading of required JavaScript® modules, the majority of JavaScript® toolkits provide helper utilities. These utilities take the path for a module and take over responsibility for loading and evaluating of that module. An application will use these utilities to ensure all required modules that it relies on are loaded before proceeding. When a loader needs to retrieve a new JavaScript® module, the loader will have to open a new HTTP connection back to the host that application is served from. This connection will be used to retrieve the associated JavaScript® file. If an application defines forty modules as requirements, this will mean the browser will have to process forty new HTTP connections.

Many Internet browsers have an in-built limit on the number of open connections that are allowed by a page back to a host. This limit is dependent on the browser being used and varies between two (Internet Explorer® 7) and fifteen (Firefox® 3.6+). JavaScript® module loaders traditionally expect the modules to reside on the same host as the page was served from.

The combination of browser connection limits along with JavaScript® modules results in increasing application loading times because the browser will only allow a fixed number of parallel resource requests. After the threshold for new connections is reached, all subsequent module loading will be suspended until an existing request has completed. The application is dependent on all modules being loaded and cannot proceed until this has been completed. This introduces an artificial delay into the loading time of an application. The more complicated the application, the more modules it will require and the longer the possible delay. Improving page load time is a critical factor for web applications. Slow applications are less likely to retain users.

A number of approaches already exist for reducing the loading time introduced by the modules pattern. The most popular approach involves building a "production" version of the application code. This takes the entire JavaScript® source code and runs it through a compiler offline. The compiler will compress and combine all the code into a single static file. In the live web application, this is the only file that needs requesting by the browser instead of each module individually. This approach will dramatically reduce the loading time caused by requiring multiple modules but at the cost of introducing a manual compilation step. However, every time the source code changes, this manual offline process will need to be repeated.

To build the production source file, a compiler needs a list of all possible modules upfront. The compiled code will include all the modules, which will always be loaded regardless of whether they are actually used in this usage of the application. Different users will make use of different code paths of a web application. It is likely that parts of the code will not be required in different scenarios, but the user pays an initial cost to load everything upfront.

A side-effect of compiling a single source file from an application's JavaScript® code is the effect on client-side caching. Browsers use client-side caching to remove the need for a client to download page elements which have not changed since the last page load. By providing the entire application code in a single file, any changes to a single module will cause the entire codebase to be refreshed, rather than just that module's code. Overall, this approach needs fewer connections, produces less delay but may cause more data to be downloaded.

Another approach, currently available in the Dojo® Toolkit, does not require the production of a single source file, but uses the compilation step to produce a lazy-loading version of the toolkit. The compiler parses and generates the base version of Dojo®, which registers stub classes for each of the base modules in Dojo® instead of actually loading that module's source. When the application tries to use a module function, the shell version will ensure the actual module source is loaded and registered. This means that nothing will be loaded until it is actually needed. While this solution removes the loading delay associated with JavaScript® modules, it still requires a manual compilation step to generate a static version of the source code. Any changes to the source code require the entire compilation process to be run again. This will cause any cached versions of files to be reloaded as the files have been regenerated even if they have not changed.

A final approach would be to distribute the modules across a number of servers with different hostnames. The browser would be able to open up multiple concurrent connections for modules from these different hosts. However, this would require access to multiple independent servers and need the module loader to have special code to handle loading from multiple hosts instead of the same host from which the application is served. In addition, the issue of loading all the code upfront, regardless of whether it is used, is unresolved.

BRIEF SUMMARY

In one embodiment of the present invention, a method for downloading an application over a network from a remote server to a client device, where the application comprises a plurality of modules, comprises creating a class for each module of the plurality of modules, where the class comprises a constructor. The method further comprises receiving a request to use a module of the application. Additionally, the method comprises determining if the received request is a first request to use the module. In addition, the method comprises downloading the requested module in response to the received request being the first request to use the module. Furthermore, the method comprises overwriting the constructor with the downloaded module in response to the received request being the first request to use the module. In addition, the method comprises executing, by a processor, the constructor within the created class for the requested module.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Owing to the principles of the present invention as discussed herein, it is possible to provide a solution that delays retrieval, parsing and loading of, for example, a JavaScript® application's module code until the point at which it is first used in an application through the use of a custom module loader and without any need for code modification. When the module load request is received at the start of an application, the loader sets up a stub class under that module name. This stub has a special constructor which can load and return the actual module code when the first instance of that module is created.

This approach dramatically speeds up the loading of large JavaScript® applications. Any delay incurred while the page is blocked processing JavaScript® modules at start-up would be completely removed using this technique. In addition, the application will only have to load and process modules which are used in this session. In many cases, this would reduce the number of HTTP connections and amount of bandwidth consumed.

Figure 1:
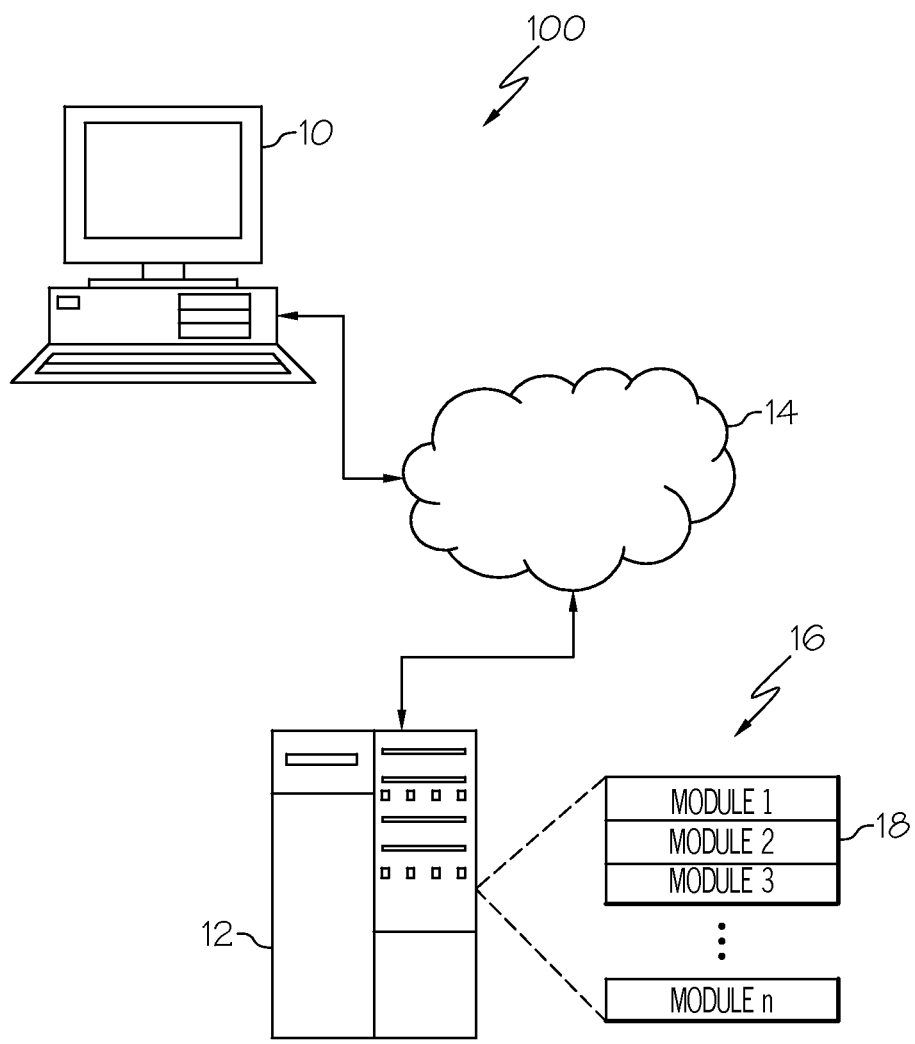
FIG. 1 illustrates a network system involving a client device and a server in accordance with an embodiment of the present invention.

Referring now to the Figures in detail, FIG. 1 illustrates a network system 100 in accordance with an embodiment of the present invention. As shown in FIG. 1, a client device 10 is connected to a remote server 12 via a network 14. System 100 shown in FIG. 1 could include a desktop computer 10 connected to a remote server 12 via a wide-area network 14, such as the Internet, or could be a terminal 10 connected to a mainframe 12 via a local-area network 14, such as a wired or wireless network provided in an office environment. The client device 10 will be running a browser that connects to one or more services provided by the remote server 12. The user can access the browser via a graphical user interface shown on a display device of the client device 10.

The server provides an application 16, which comprises a plurality of modules 18. These modules 18 are numbered 1 to n, to illustrate that there could be a large number of different modules 18 that make up the totality of the application 16. The application 16 could be created in JavaScript®, for example, and the user will access the application 16 through their browser running on the client device 10. This type of application provision is increasingly common on websites that are available via the Internet. Essentially, a complex application 16 is run in its entirety within the confines of the browser that is being used to access websites by the user.

As has been detailed above, in the discussion of the Background, the increasing size and complexity of this type of application has created a number of issues with the loading of the application 16. When the user first accesses the application 16, then existing technologies are configured to download the application in its entirety prior to the running of the application 16. The size and number of the modules increases the download time required. In many instances, this creates an unacceptable delay in the starting of the application 16, and indeed many users who are familiar with fast browsing of the Internet will think that the website or application has malfunctioned.

To reduce application load time without requiring a manual compilation of the application 16 into a single module requires a new client-side module loader. Currently, module loaders take a module path, issue a request to load its contents and evaluate the results in the browser, making that module's code available to the application 16 when it is run. This has the significant disadvantage that if the application 16 is comprised of individual modules 18 (which is desirable for reuse of modules 18 and other reasons) then either the entirety of the modules 18 have to be loaded before the application 16 can start, or even worse, the browser cannot open enough connections to all of the modules simultaneously and loading slows even further.

However, in the modified loader of the improved system, when a new module load command is received, instead of automatically beginning to pull in that modules' code over the protocol (for example HTTP), the improved loader will define a new JavaScript® class under that module's path name. The class will be empty apart from a constructor. When JavaScript® applications want to use modules, they have to instantiate new instances of the module. When this happens, the module name being instantiated will have its constructor executed to set up any class variables before returning. So instead of loading the entire set of modules 18, a short stub class is created locally for each module 18 in the application 16.

Figure 2:
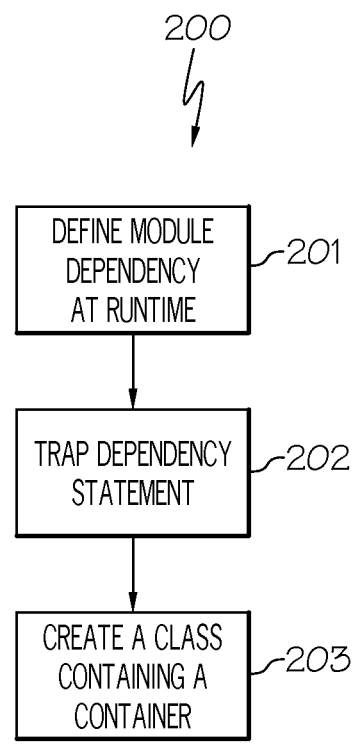
FIG. 2 is a flowchart of a method for operating a loader in accordance with an embodiment of the present invention.

This methodology is illustrated in the flowchart of FIG. 2, which is a flowchart of a method 200 for operating a loader in accordance with an embodiment of the present invention. Referring to FIG. 2, in conjunction with FIG. 1, in step 201, the application defines the module dependency at runtime. The application 16 will provide a definition of all of the modules 18 that are needed for the application 16 and the dependency between them (which module 18 refers to which other module, etc.). In step 202, the improved loader will acquire the module dependency statement, and rather than loading all of the individual modules, will, at step 203, create a new stub constructor for the dependency. Each module 18 that forms part of the application will have a stub class created containing a constructor.

In some implementations, method 200 may include other and/or additional steps that, for clarity, are not depicted. Further, in some implementations, method 200 may be executed in a different order presented and that the order presented in the discussion of FIG. 2 is illustrative. Additionally, in some implementations, certain steps in method 200 may be executed in a substantially simultaneous manner or may be omitted.

The first time an application creates a new instance of a module set up by the special loader, the constructor in the stub module will be called. Loading of the module's code is delayed until this point. The constructor performs the HTTP request for the module's code and evaluates the result in the browser. This will overwrite the module's reference to the stub class to point to the new module code. When this has been completed, the constructor will instantiate a new instance of the module 18. This will call the actual module's constructor, setting up any module details as needed, and can then be returned as the result of the instantiated version of the module 18.

The application 16 then has a reference to the module 18 containing the actual code, rather than an empty stub module. To the application code, the module instance performs as normal and there are no side effects from delaying the actual loading to the point of execution. Any further instances of the module 18 that are instantiated will call the normal module code because the stub constructor has been replaced. The module 18 can only be loaded once. Effectively, the modified loader creates a dummy class that contains only the constructor, which operates to load the correct module code the first time that the module 18 is needed. If the module 18 is never used, the actual module 18 is never downloaded.

Figure 3:
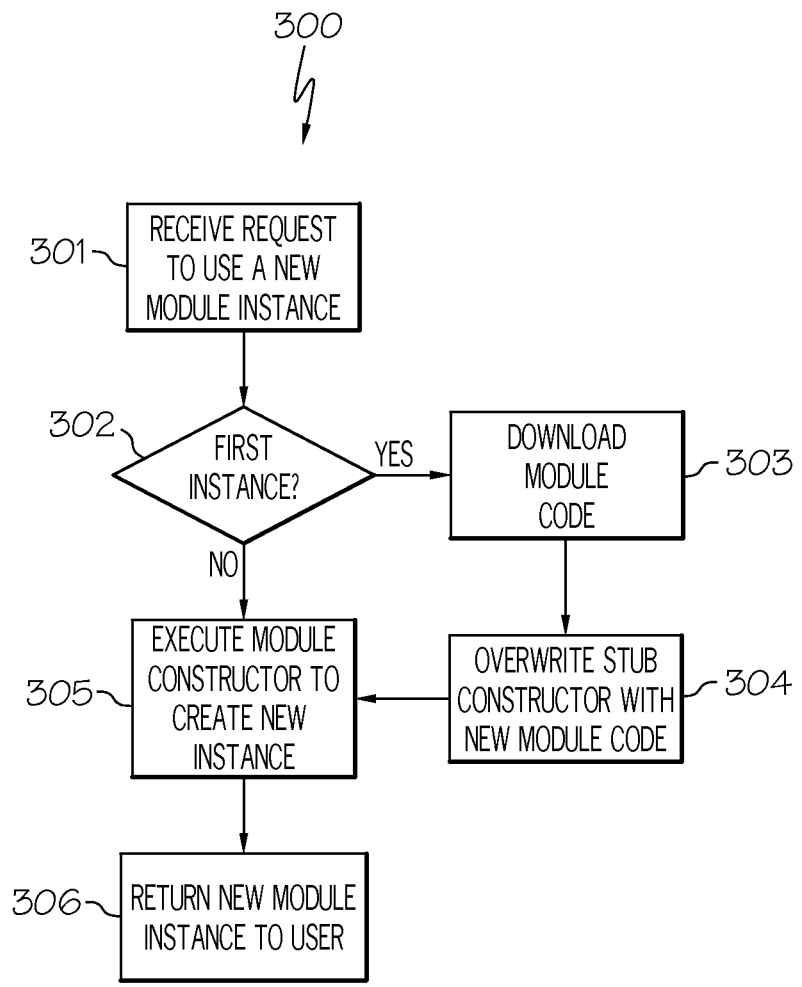
FIG. 3 is a flowchart of a method for downloading an application over a network from a remote server to a client device in accordance with an embodiment of the present invention.

This approach is summarized in the flowchart of FIG. 3, which is a flowchart of a method 300 for downloading an application over a network from a remote server to a client device in accordance with an embodiment of the present invention. Referring to FIG. 3, in conjunction with FIG. 1, in step 301, the user requests a new module instance by taking an action within the application 16 that will require a new module 18. In step 302, a check is made to see if the received request is the first request to use a module 18. If it is, then at step 303, the module code is downloaded, and at step 304, the original constructor is overwritten by the downloaded module code. In this step, the original stub constructor has been overwritten by the actual module constructor. The stub constructor's role is solely to load the file the first time it is triggered, overwriting the module definition in memory. The actual module code will have a constructor used to initialize instance variables in the module. Upon overwriting the sub constructor with the new module code, or, if, however, the received request is not the first request to use a module 18, then, in step 305, the module constructor is executed to create a new instance of the module. In step 306, the new module 18 is returned to the user for execution in the application 16.

In some implementations, method 300 may include other and/or additional steps that, for clarity, are not depicted. Further, in some implementations, method 300 may be executed in a different order presented and that the order presented in the discussion of FIG. 3 is illustrative. Additionally, in some implementations, certain steps in method 300 may be executed in a substantially simultaneous manner or may be omitted.

Figure 4:
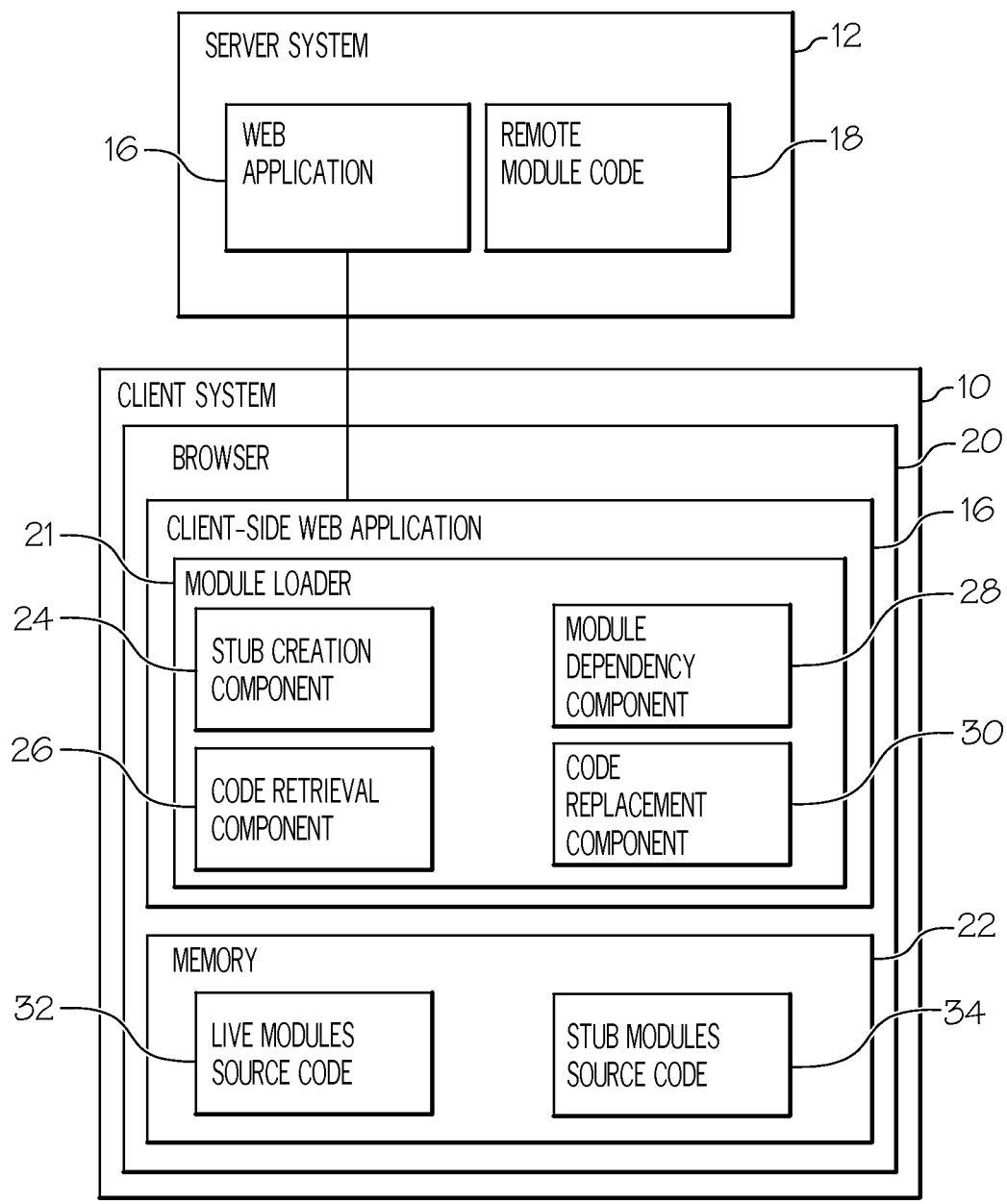
FIG. 4 is a schematic diagram of the client device and the server in accordance with an embodiment of the present invention.

FIG. 4 is a schematic diagram of the client device 10 and the remote server 12 in accordance with an embodiment of the present invention. Referring to FIG. 4, the web application 16 and module code 18 are stored by the server system 12 and a browser 20 creates a client side version of the application 16 on the client device 10. The browser 20 also includes a memory allocation 22 that can be written to and read from, as desired. The browser 20 provides a graphical user interface for a user to operate to access the application 16. The browser 20 also comprises a loader 21 for the purpose of controlling the loading of the modules 18 into the browser's memory 22.

The browser 20 includes various components that handle the modules 18. The loader 21 is comprised of the four components, a stub creation component 24, a code retrieval component 26, a module dependency component 28 and a code replacement component 30. This stub creation component 24 is responsible for defining an empty "stub" module, stored as a representation of the module dependency included by the application 16. The stub module is invoked the first time a module is created. The code retrieval component 26 uses an AJAX call to load dependent modules when they are initially invoked rather than on page load. The component 26 is arranged to call the remote web server 12 with the exact module location, downloading the relevant source code over HTTP and returning to the loader component.

The module dependency component 28 is used by the web application 16 to define inter-application dependencies and is responsible for coordinating the loading of dependent modules 18 in a timely fashion. This is used to set up the stub modules when the initial module definition requests are trapped. The code replacement component 30 is responsible for overwriting the module stub code in the application's memory 22 with the newly loaded source code returned from the code retrieval component 26.

In the memory 22 of the client device 10, the live modules source code 32 references the section of the host system's dynamic memory 22 storing the live object references for application modules 18 that have been explicitly defined as dependencies and instantiated during the application's lifetime. The stub modules source code 34 references the section of the host system's dynamic memory 22 storing the live object references for stub modules that relate to modules that have been explicitly defined as dependencies but not instantiated.

Figure 5:
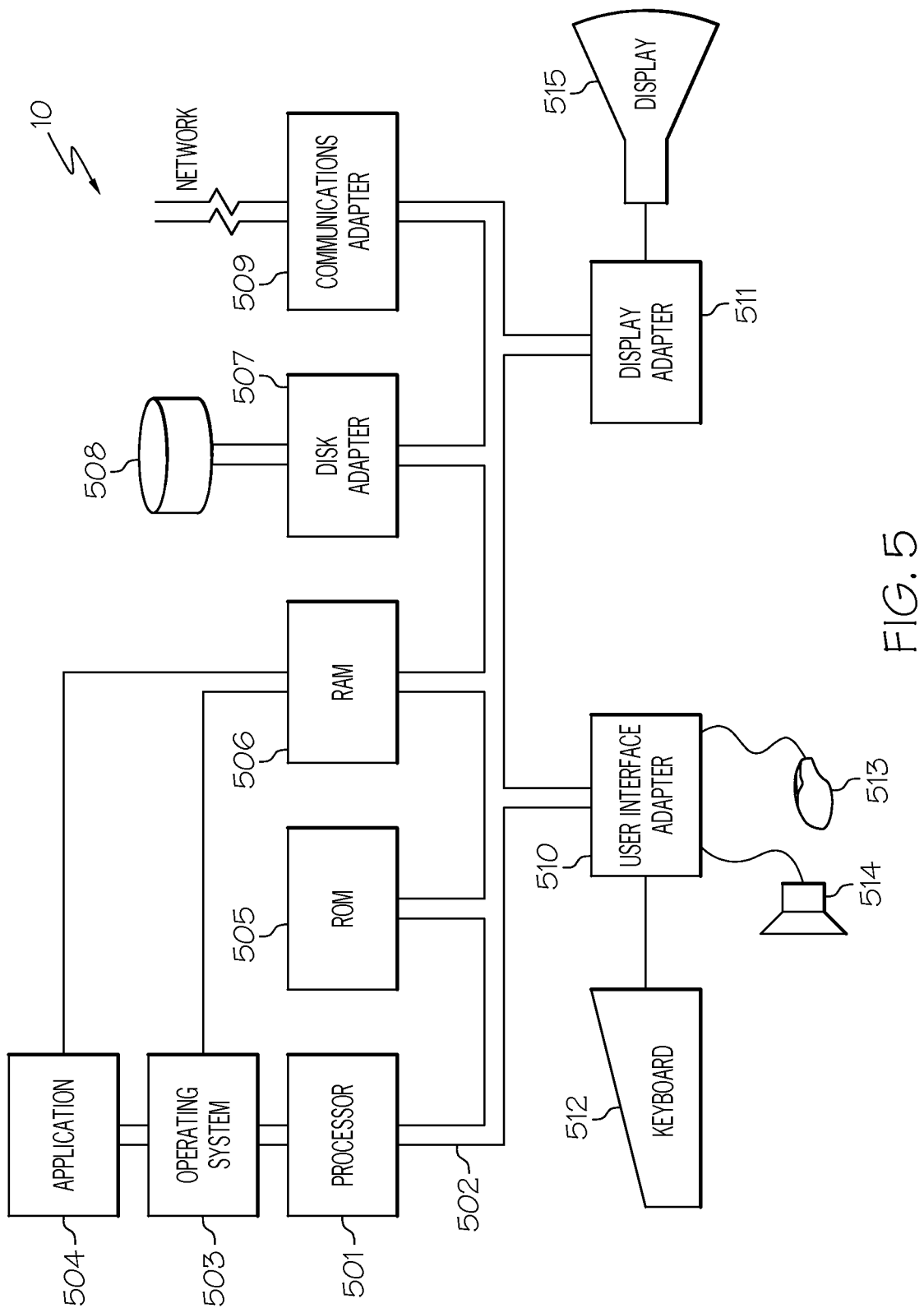
FIG. 5 depicts an embodiment of a hardware configuration of the client device which is representative of a hardware environment for practicing the present invention.

FIG. 5 depicts an embodiment of a hardware configuration of the client device 10 which is representative of a hardware environment for practicing the present invention. Referring to FIG. 5, client device 10 has a processor 501 coupled to various other components by system bus 502. An operating system 503 may run on processor 501 and provide control and coordinate the functions of the various components of FIG. 5. An application 504 in accordance with the principles of the present invention may run in conjunction with operating system 503 and provide calls to operating system 503 where the calls implement the various functions or services to be performed by application 504. Application 504 may include, for example, an application for downloading an application over a network 14 (FIG. 1) from a remote server 12 (FIGS. 1 and 4) as discussed above.

Referring again to FIG. 5, read-only memory ("ROM") 505 may be coupled to system bus 502 and include a basic input/output system ("BIOS") that controls certain basic functions of client device 10. Random access memory ("RAM") 506 and disk adapter 507 may also be coupled to system bus 502. It should be noted that software components including operating system 503 and application 504 may be loaded into RAM 506, which may be client device's 10 main memory for execution. Disk adapter 507 may be an integrated drive electronics ("IDE") adapter that communicates with a disk unit 508, e.g., disk drive.

Client device 10 may further include a communications adapter 509 coupled to bus 502. Communications adapter 509 may interconnect bus 502 with an outside network (e.g., network 14) thereby allowing client device 10 to communicate with remote server 12.

I/O devices may also be connected to client device 10 via a user interface adapter 510 and a display adapter 511. Keyboard 512, mouse 513 and speaker 514 may all be interconnected to bus 502 through user interface adapter 510. A display monitor 515 may be connected to system bus 502 by display adapter 511. In this manner, a user is capable of inputting to client device 10 through keyboard 512 or mouse 513 and receiving output from client device 10 via display 515 or speaker 514.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for downloading an application over a network from a remote server to a client device, the application comprising a plurality of modules, the method comprising:

creating a class for each module of the plurality of modules, the class comprising a stub constructor;

receiving a request to use a module of the plurality of modules of the application;

determining if the received request is a first request to use the module;

downloading the requested module in response to the received request being the first request to use the module;

overwriting the stub constructor with the downloaded module having a module constructor in response to the received request being the first request to use the module; and executing, by a processor, the module constructor within the created class for the requested module.

2. The method as recited in claim 1, wherein the creating of the class for the module comprises creating a new class under the module's path name.

3. The method as recited in claim 1, wherein the created class for each module is empty apart from the stub constructor.

4. The method as recited in claim 1, wherein the overwriting of the stub constructor with the downloaded module results in a creation of a class containing the downloaded module.

5. A computer program product embodied in a computer readable storage device for downloading an application over a network from a remote server to a client device, the application comprising a plurality of modules, the computer program product comprising the programming instructions for:

creating a class for each module of the plurality of modules, the class comprising a stub constructor;

receiving a request to use a module of the plurality of modules of the application;

determining if the received request is a first request to use the module;

downloading the requested module in response to the received request being the first request to use the module;

overwriting the stub constructor with the downloaded module having a module constructor in response to the received request being the first request to use the module; and executing the module constructor within the created class for the requested module.

6. The computer program product as recited in claim 5, wherein the programming instructions for creating the class for the module comprises the programming instructions for creating a new class under the module's path name.

7. The computer program product as recited in claim 5, wherein the created class for each module is empty apart from the stub constructor.

8. The computer program product as recited in claim 5, wherein the programming instructions for overwriting the stub constructor with the downloaded module results in a creation of a class containing the downloaded module.

9. A system, comprising:

a memory unit for storing a computer program for downloading an application over a network from a remote server to a client device, the application comprising a plurality of modules; and a processor coupled to the memory unit, wherein the processor is configured to execute program instructions of the computer program comprising:

creating a class for each module of the plurality of modules, the class comprising a stub constructor;

receiving a request to use a module of the plurality of modules of the application;

determining if the received request is a first request to use the module;

downloading the requested module in response to the received request being the first request to use the module;

overwriting the stub constructor with the downloaded module having a module constructor in response to the received request being the first request to use the module; and executing the module constructor within the created class for the requested module.

10. The system as recited in claim 9, wherein the program instructions for creating the class for the module comprises program instructions for creating a new class under the module's path name.

11. The system as recited in claim 9, wherein the created class for each module is empty apart from the stub constructor.

12. The system as recited in claim 9, wherein the program instructions for overwriting the stub constructor with the downloaded module results in a creation of a class containing the downloaded module.

* * * * *